2,710,846
Patented June 14, 1955

2,710,846
POLYMER CONTAINING COMPOSITIONS COMPRISING AN ACRYLONITRILE POLYMER, A THIOCYANATE AND WATER

Melvin A. Dietrich, Claymont, and Alfred F. Smith, Wilmington, Del., assignors to E. I. du Pont de Nemours & Company, Wilmington, Del., a corporation of Delaware No Drawing. Application January 18, 1952,
Serial No. 267,210

13 Claims. (Cl. 260—29.6)

This invention relates to thermoplastic compositions containing acrylonitrile polymers and more particularly to solid mixtures of polymeric acrylonitriles, a thiocyanate, and water.

Shaped articles from certain organic polymers that are not thermoplastic and not subject to formation from their molten state are generally obtained from solutions. Organic solvents generally used are expensive and frequently are disadvantageous in that they may have toxic properties or are difficult to recover.

Salt solutions have been suggested as solvents for such relatively intractable polymers as polyacrylonitrile, as shown by U. S. 2,140,921. It is not possible to obtain solutions that are high in polymer content or that contain large amounts of high molecular weight polymer. These solutions are employed to give objects of relatively thin cross-sectional area by removal of the salt and water. Such systems cannot be used to provide a method of obtaining both films and filaments as well as molded objects by simple techniques standard for the fabrication of thermoplastic polymers.

This invention has as an object the provision of compositions having novel utility. Another object is the provision of new solid compositions. A further object is the provision of compositions of high polymer content but capable of being shaped at moderate shaping temperatures and pressures and with reduced tendency to deteriorate and discolor in the shaping procedure. Another object is the provision of a novel process for the preparation of polyacrylonitrile shaped objects. Other objects will appear hereinafter.

These objects are accomplished by the present invention of solid, non-fluid compositions containing 37–75% of an acrylonitrile polymer containing acrylonitrile in major proportion, 18–42% of an alkali or alkaline earth thiocyanate, and a water content of 5–31% and having a ratio of salt to polymer of from 3:10 to 10:12 and salt to water of from 1:1 to 5:1. These compositions are solid at temperatures of the order of 75° C., are thermoplastic, and capable of being shaped under pressure at temperatures above about 115° C. A further aspect of the invention is the preparation of shaped objects by shaping the same under pressure at temperatures of at least 115° C. but below the decomposition point of the acrylonitrile polymer. The minimum pressure is dependent upon the specific shaping process employed and is 50 lbs. per sq. in. or higher.

In the examples, films were obtained by the use of a Carver press with the pressure reported as the gauge pressure which corresponds to an actual pressure of the order of 400–1000 lbs. per sq. in. of film.

The following examples in which parts are by weight are illustrative of the invention.

Example I

A composition was made up by mixing 15 parts by weight of polyacrylonitrile (intrinsic viscosity of 1.87), 7.5 parts of sodium thiocyanate, and 7.5 parts of water by adding the water dropwise during mixing (50%/25%/25% of polymer/salt/water). Portions of this composition (a powder) were pressed in a press at different temperatures and 15,000 lbs. per square inch pressure. At 115° and 125° C. clear and tough films (5 mils thick) were obtained. They were not tacky.

Example II

Ten parts by weight of polyacrylonitrile (intrinsic viscosity of 1.87) and 10 parts of aqueous 57% calcium thiocyanate solution were thoroughly mixed. The composition, which contained 50% polyacrylonitrile, 28.5% calcium thiocyanate, and 21.5% water, was powdery in nature. It formed tough, pliable films when pressed at 220° C. and 15,000 lbs./sq. in. in a press. The films could be drawn 100% before washing. The drawn film, after washing and drying, was clear but somewhat brittle.

Example III

The following compositions were made up and pressed into films on a press at 180° C. and 17,000 lbs/sq in.

| Polyacrylonitrile $[\eta]_{int}=1.87$ | Alkali Thiocyanate | Water | Characteristics of Composition | Characteristics of Film |
|---|---|---|---|---|
| 1.6 (37%) | 1.7 (NaSCN) (23%) | 1.0 (23%) | Gum | Clear, tough, and flexible. |
| 3.0 (60%) | 1.0 (NaSCN) (20%) | 1.0 (20%) | Powder | Do. |
| 4.2 (65%) | 1.3 (Ca(SCN)$_2$) (20%) | 1.0 (15%) | do | Do. |
| 10.0 (72%) | 3.0 (NaSCN) (21%) | 1.0 (7%) | do | Clear, slightly brittle. |

Example IV

The following compounds were mixed thoroughly to form a solid powdery material: ten parts by weight of an acrylonitrile/styrene copolymer (7.3% styrene, intrinsic viscosity of 1.98), three parts of sodium thiocyanate, and one part by weight of water (72%/21%/7% of polymer/salt/water). A film pressed at 170° C. and 15,000 lbs/sq. in. in a press was clear, tough, and flexible.

Example V

The general procedure of Example IV was repeated except that potassium thiocyanate was employed as the salt. A powder was obtained from which a film pressed at 170° C. and 15,000 lbs/sq. in. was clear, tough, and flexible.

Example VI

The following were mixed to form a lumpy powder: ten parts acrylonitrile/isobutylene polymer (17% by weight of isobutylene), three parts potassium thiocyanate, and one part water. Films pressed at 170° C. and 15,000 lbs./sq. in. were tough and flexible.

The present invention is generic to compositions containing 18–42% of an alkali forming metal thiocyanate, 5–31% of water, and 37–75% of an acrylonitrile addition polymer in which acrylonitrile is the major component, the ratio of salt to polymer being from 3:10 to 10:12 and the ratio of salt to water being from 1:1 to 5:1. Compositions containing polymers of at least 85% acrylonitrile content represent a particularly desirable class because of the advantageous physical properties of shaped objects from such copolymers. Acrylonitrile homopolymers are particularly preferred. However, the invention includes within its scope copolymers with minor proportions, preferably not more than 15%, of another polymerizable vinylidene monomer. Thus, there may, for example, be employed copolymers of acrylonitrile with methacrylonitrile, vinyl chloride, vinyl acetate, styrene; amino-nitrogen-containing monomers, e. g., vinylpyridines; quaternary ammonium monomers, e. g., vinyloxyethyltrimethylammonium chloride, etc.

The polymer is preferably employed in a finely divided form in the manufacture of the solid coherent compositions of this invention. Mixture with the salt and water is effected faster when the particle size of the polymer is small, e. g., such as that obtained by the polymerization of acrylonitrile in aqueous systems.

The molecular weight of the polymer is not critical. In general, the polymer should be fiber forming since its utility is usually greatest for such polymers. Polymers having a medium molecular weight, e. g., 5,000 to 100,000, offer a good balance between ease of fabrication and physical properties of the resulting shaped and oriented objects.

The amount of acrylonitrile polymers present in the polymer/salt/water mixture is at least 37% and less than 75%. In general, preferred products have from 40 to 65% polymer.

The compositions of this invention comprise from 5 to 31% water. When less than 5% water is present, coherent and plastic solid masses are not obtained. When more than 31% water is present the polymer concentration is too low to be satisfactory for many purposes and the composition is too "liquid." The third component of the compositions of this invention is an alkali forming metal thiocyanate, i. e., a thiocyanate of an alkali metal or an alkaline earth metal. For practical purposes, the most desired thiocyanates are those of lithium, sodium, potassium, magnesium, and calcium, in view of their availability and ease in forming the plastic solid compositions.

The amount of thiocyanate employed in the production of the composition of this invention is 18 to 42% by weight of the polymer/salt/water. Most useful are amounts of from 25 to 40%.

The solid compositions are obtained by milling, mixing in a mortar, Waring blender, Thropp mill, Banbury mixer, or similar apparatus, of the ingredients employed.

The products of this invention can be modified by the addition of color forming materials, plasticizers, extenders, e. g., cork and asbestos, surface active agents, etc. Examples of such materials are carbon black, zinc oxide, pigments, zinc stearate, and sodium oleate. Polymer dispersions, e. g., of synthetic or natural rubber, can also be employed.

The plastic materials of this invention are useful for the preparation of films and fibers, e. g., by extrusion into water, melt pressing, calendering, etc. at temperatures of 115 to 220° C. and preferably 125 to 200° C. and pressures of 50–1000 lbs. per sq. in. or higher. Fibers are generally obtained by extrusion at temperatures of the order of 150° C.

The shaped objects prepared from the solid compositions of the present invention are distinctly advantageous in that excess hot water rapidly removes the salt from such molded objects. Thus, tests on 6 mil films show that all of the salt is removed in 15 to 30 seconds by hot water; whereas, films containing other agents such as tetramethylene sulfone or dimethylformamide require as high as 240 seconds' contact with hot water. This is particularly advantageous in the extrusion, or melt press, spinning of fibers where efficient removal of "carrier materials" at rapid times cuts the time and thereby increases the output per unit machine and per unit cost. Furthermore, high concentrations of polymer can be used in fabrication of objects such as films and fibers. The cross-section of products thereby obtained is less distorted than where low concentrations are necessary and more "carrier materials" are needed. Solutions or dispersions containing such high concentrations of polymer are not susceptible to use in the preparation of such objects at moderate temperatures and pressures. These moderate temperatures and pressures allow the production of shaped objects with less tendency to deterioration, decomposition, and discoloration. The compositions of this invention are furthermore of advantage in that the non-polymer ingredients are low cost materials, readily available, and, of importance in regeneration processes, readily recoverable.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A solid, non-fluid, thermoplastic composition consisting essentially of 18–42% of a thiocyanate of the class consisting of alkali metal thiocyanates and alkaline earth metal thiocyanates, 5–31% water, and 37–75% of an acrylonitrile polymer of predominant acrylonitrile content, said composition having a salt:polymer ratio of 3:10 to 10:12 and a salt:water ratio of 1:1 to 5:1.

2. A solid, non-fluid, thermoplastic composition consisting essentially of 18–42% of a thiocyanate of the class consisting of alkali metal thiocyanates and alkaline earth metal thiocyanates, 5–31% water, and 37–75% of an acrylonitrile polymer of at least 85% acrylonitrile content, said composition having a salt:polymer ratio of 3:10 to 10:12 and a salt:water ratio of 1:1 to 5:1.

3. A solid, non-fluid, thermoplastic composition consisting essentially of 18–42% of an alkali metal thiocyanate, 5–31% water, and 37–75% of an acrylonitrile polymer of at least 85% acrylonitrile content, said composition having a salt:polymer ratio of 3:10 to 10:12 and a salt:water ratio of 1:1 to 5:1.

4. A solid, non-fluid, thermoplastic composition consisting essentially of 18–42% of an alkaline earth metal thiocyanate, 5–31% water, and 37–75% of an acrylonitrile polymer of at least 85% acrylonitrile content, said composition having a salt:polymer ratio of 3:10 to 10:12 and a salt:water ratio of 1:1 to 5:1.

5. Process for the preparation of shaped objects wherein a solid discontinuous mass consisting essentially of 18–42% of a thiocyanate of the class consisting of alkali metal thiocyanates and alkaline earth metal thiocyanates, 5–31% water, and 37–75% of an acrylonitrile polymer of at least 85% acrylonitrile content, said composition having a salt:polymer ratio of 3:10 to 10:12 and a salt:water ratio of 1:1 to 5:1 is shaped under a pressure of 50 to 1000 lbs./in.$^2$ and at a temperature of 115 to 220° C. until the mass loses its discontinuity.

6. Process for the preparation of shaped objects wherein a solid discontinuous mass consisting essentially of 18–42% of a thiocyanate of the class consisting of alkali metal thiocyanates and alkaline earth metal thiocyanates, 5–31% water, and 37–75% of an acrylonitrile polymer of at least 85% acrylonitrile content, said composition having a salt:polymer ratio of 3:10 to 10:12 and a salt:water ratio of 1:1 to 5:1 is shaped under a pressure of at least 50 lbs./in.$^2$ and at a temperature of at least 125° C. but below the decomposition temperature of the polymer until the mass becomes continuous.

7. A solid, non-fluid, thermoplastic composition consisting essentially of 18–42% of a thiocyanate of the class consisting of alkali metal thiocyanates and alkaline earth metal thiocyanates, 5–31% water, and 37–75% of an acrylonitrile homopolymer, said composition having a salt:polymer ratio of 3:10 to 10:12 and a salt:water ratio of 1:1 to 5:1.

8. A solid, non-fluid, thermoplastic composition consisting essentially of 18–42% of an alkali metal thiocyanate, 5–31% water, and 37–75% of an acrylonitrile homopolymer, said composition having a salt:polymer ratio of 3:10 to 10:12 and a salt:water ratio of 1:1 to 5:1.

9. A solid, non-fluid, thermoplastic composition consisting essentially of 18–42% of an alkaline earth metal thiocyanate, 5–31% water, and 37–75% of an acrylonitrile homopolymer, said composition having a salt:polymer ratio of 3:10 to 10:12 and a salt:water ratio of 1:1 to 5:1.

10. Process for the preparation of shaped objects wherein a solid discontinuous mass consisting essentially of 18–42% of a thiocyanate of the class consisting of alkali metal thiocyanates and alkaline earth metal thiocyanates, 5–31% water, and 37–75% of an acrylonitrile homopolymer, said composition having a salt:polymer ratio of 3:10 to 10:12 and a salt:water ratio of 1:1 to 5:1 is shaped under a pressure of 50 to 100 lbs./in.² and at a temperature of 115 to 220° C. until the mass loses its discontinuity.

11. Process for the preparation of shaped objects wherein a solid discontinuous mass consisting essentially of 18–42% of a thiocyanate of the class consisting of alkali metal thiocyanates and alkaline earth metal thiocyanates, 5–31% water, and 37–75% of an acrylonitrile homopolymer, said composition having a salt:polymer ratio of 3:10 to 10:12 and a salt:water ratio of 1:1 to 5:1 is shaped under a pressure of at least 50 lbs./in.² and at a temperature of at least 125° C. but below the decomposition temperature of the homopolymer until the mass becomes continuous.

12. Process for the preparation of shaped objects wherein a solid discontinuous mass consisting essentially of 18–42% of an alkali metal thiocyanate, 5–31% water, and 37–75% of an acrylonitrile homopolymer, said composition having a salt:polymer ratio of 3:10 to 10:12 and a salt:water ratio of 1:1 to 5:1 is shaped under a pressure of at least 50 lbs./in.² and at a temperature of the homopolymer until the mass becomes continuous.

13. A solid, non-fluid, thermoplastic composition consisting essentially of 18–42% of a thiocyanate of the class consisting of alkali metal thiocyanates and alkaline earth metal thiocyanates, 5–31% water, and 37–75% of an acrylonitrile polymer of at least 85% acrylonitrile content, the remainder being composed of monoethylenically unsaturated monomer units, said composition having a salt:polymer ratio of 3:10 to 10:12 and a salt:water ratio of 1:1 to 5:1.

14. A solid, non-fluid, thermoplastic composition consisting essentially of 18–42% of an alkali metal thiocyanate, 5–31% water, and 37–75% of an acrylonitrile polymer of at least 85% acrylonitrile content, the remainder being composed of monoethylenically unsaturated monomer units, said composition having a salt:polymer ratio of 3:10 to 10:12 and a salt:water ratio of 1:1 to 5:1.

15. Process for the preparation of shaped objects wherein a solid discontinuous mass consisting essentially of 18–42% of a thiocyanate of the class consisting of alkali metal thiocyanates and alkaline earth metal thiocyanates, 5–31% water, and 37–75% of an acrylonitrile polymer of at least 85% acrylonitrile content, the remainder being composed of monoethylenically unsaturated monomer units, said composition having a salt:polymer ratio of 3:10 to 10:12 and a salt:water ratio of 1:1 to 5:1 is shaped under a pressure of at least 50 lbs./in.² and at a temperature of at least 125° C. but below the decomposition temperature of the polymer until the mass becomes continuous.

16. Process for the preparation of shaped objects wherein a solid discontinuous mass consisting essentially of 18–42% of sodium thiocyanate, 5–31% water, and 37–75% of an acrylonitrile homopolymer, said composition having a salt:water ratio of 1:1 to 5:1 is shaped under a pressure of 50–100 lbs./in.² and at a temperature of 115 to 220° C. until the mass loses its discontinuity.

17. Process for the preparation of shaped objects wherein a solid discontinuous mass consisting essentially of 18–42% of calcium thiocyanate, 5–31% water, and 37–75% of an acrylonitrile homopolymer, said composition having a salt:water ratio of 1:1 to 5:1 is shaped under a pressure of 50–100 lbs./in.² and at a temperature of 115 to 220° C. until the mass loses its discontinuity.

18. Process for the preparation of shaped objects wherein a solid discontinuous mass consisting essentially of 18–42% of potassium thiocyanate, 5–31% water, and 37–75% of an acrylonitrile homopolymer, said composition having a salt:water ratio of 1:1 to 5:1 is shaped under a pressure of 50–100 lbs./in.² and at a temperature of 115 to 220° C. until the mass loses its discontinuity.

References Cited in the file of this patent

UNITED STATES PATENTS

| | | |
|---|---|---|
| 2,140,921 | Rein | Dec. 20, 1938 |
| 2,486,943 | Hammer et al. | Nov. 1, 1949 |
| 2,533,224 | Cresswell | Dec. 12, 1950 |
| 2,558,730 | Cresswell | July 3, 1951 |
| 2,648,649 | Stanton et al. | Aug. 11, 1953 |